(12) United States Patent
Krug et al.

(10) Patent No.: US 9,511,719 B2
(45) Date of Patent: Dec. 6, 2016

(54) HOLDER FOR FASTENING A COMPONENT TO A GLASS PANE

(71) Applicant: Daimler AG, Stuttgart (DE)

(72) Inventors: Martin Krug, Karlsruhe (DE); Axel Schmidt, Filderstadt (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 14/440,281

(22) PCT Filed: Oct. 18, 2013

(86) PCT No.: PCT/EP2013/003134
§ 371 (c)(1),
(2) Date: May 1, 2015

(87) PCT Pub. No.: WO2014/067624
PCT Pub. Date: May 8, 2014

(65) Prior Publication Data
US 2015/0314735 A1 Nov. 5, 2015

(30) Foreign Application Priority Data
Nov. 2, 2012 (DE) .................... 10 2012 021 571

(51) Int. Cl.
*B60R 11/04* (2006.01)
*B60R 11/00* (2006.01)
(Continued)

(52) U.S. Cl.
CPC ............... *B60R 11/00* (2013.01); *B60R 11/04* (2013.01); *B60R 21/00* (2013.01); *B60S 1/0881* (2013.01);
(Continued)

(58) Field of Classification Search
CPC .... B60R 11/04; B60R 2011/0063; B60R 1/12; B60R 2011/0026; B60R 11/00
(Continued)

(56) References Cited

U.S. PATENT DOCUMENTS

2011/0233248 A1* 9/2011 Flemming ............... B60R 11/00
224/482
2013/0314538 A1* 11/2013 Schofield .................. B60R 1/04
348/148

FOREIGN PATENT DOCUMENTS

CN 102171068 A 8/2011
DE 100 25 703 A1 11/2000
(Continued)

OTHER PUBLICATIONS

Translation of DE10211444.*
(Continued)

*Primary Examiner* — Rodney Mintz
*Assistant Examiner* — Daniel Kenny
(74) *Attorney, Agent, or Firm* — Crowell & Moring LLP

(57) ABSTRACT

A holder to fasten at least one component to a glass pane, in particular to a windscreen of a motor vehicle, is disclosed. The holder has a supporting body, which has a lower side, with which the supporting body is able to be adhered to the glass pane by adhesion, and an upper side, on which the holding elements are arranged to fasten the at least one component to the supporting body. A simplified installation results if a first section of the supporting body, which is provided to fasten at least one component, is separated from the remaining supporting body along two separate slots, where both slots begin at an outer edge of the supporting body and end at a connection region at a distance from the outer edge, via which the first section is connected to the remaining supporting body.

9 Claims, 3 Drawing Sheets

(51) Int. Cl.
*B60R 21/00* (2006.01)
*B60S 1/08* (2006.01)

(52) U.S. Cl.
CPC . *B60R 2011/0026* (2013.01); *B60R 2011/0063* (2013.01)

(58) Field of Classification Search
USPC .................................................. 248/205.3
See application file for complete search history.

(56) References Cited

FOREIGN PATENT DOCUMENTS

| | | |
|---|---|---|
| DE | 102 11 444 A1 | 10/2003 |
| DE | 10 2004 061 361 A1 | 2/2006 |
| DE | 10 2008 050 320 A1 | 4/2010 |
| DE | 10 2009 054 828 A1 | 6/2011 |
| DE | 10 2011 121 003 A1 | 6/2013 |
| WO | WO 2013/087145 A1 | 6/2013 |

OTHER PUBLICATIONS

PCT/EP2013/003134, International Search Report dated Nov. 27, 2013 (Two (2) pages).
German Office Action dated Oct. 11, 2013 (Five (5) pages).
Chinese Office Action issued in Chinese counterpart application No. 201380057263.X dated May 6, 2016, with partial English translation (Seven (7) pages).

* cited by examiner

HOLDER FOR FASTENING A COMPONENT TO A GLASS PANE

BACKGROUND AND SUMMARY OF THE INVENTION

The present invention relates to a holder for fastening at least one component to a glass pane, in particular to a windscreen of a motor vehicle.

Such a holder is known from DE 102 11 444 A1. It comprises a supporting body which has a lower side and an upper side. The supporting body can be adhered to the glass pane by means of adhesion with the lower side. Holding elements to fasten the at least one component to the supporting body are arranged on the upper side.

The known holder serves to fix a light and rain sensor to the glass pane. At the same time, the known holder encloses a holding foot, with the aid of which an inner rear-view mirror of the vehicle can be fastened to the glass pane. In the case of the known holder, the supporting body is divided into several sections which are connected to one another with expansion joints. The individual expansion joints therein each extend transversely to a longitudinal direction of the supporting body. Furthermore, the respective expansion joint is formed by a slot and at least two U-shaped clips which bridge the slot. The respective slot penetrates the supporting body, whereby the individual sections are able to move relative to one another. The sections, however, remain connected to one another via the clips. Thermally-caused expansion effects can be kept in control by this segmentation of the supporting body.

A further holder, with the aid of which a light and rain sensor can be fastened to a windscreen of a motor vehicle, is known from DE 10 2004 061 361 A1.

In modern vehicles, with the aid of such a holder, in addition to a rain and light sensor into which a fogging sensor can furthermore be integrated, further components can be installed on the windscreen, such as for example a camera. Such a camera can be used for road recognition as well as for road monitoring. Likewise, it can be a night-vision camera, in particular an infra-red camera, which enables thermal recognition of obstacles in cases of reduced vision. Furthermore, stereo camera systems can also be used in which two cameras or a stereo camera with two lenses are arranged for each purpose, with the aid of which a three-dimensional image can be generated. Three-dimensional images can be used, for example, to determine distances and suchlike.

A need therefore exists for comparably large holders which must be fastened extensively to the respective glass pane and with the aid of which several, comparably heavy components can be fixed to the glass pane. Due to production tolerances, the shapes of the glass panes, in particular the radii of curvature of windscreens, vary. Likewise, production tolerances for the holders, which are preferably injection molded and made of plastic, lead to varying dimensions and shapes for the holder. Furthermore, in particular for windscreens, the problem exists that for a large holder, the curvature of the windscreen leads to a continuous supporting body having to be pressed on comparably strongly during adhesion to generate a homogeneous adhesive gap. If the contact pressure is reduced before a final setting or drying of the adhesive, the elastic restoring force contained in the supporting body exceeds the holding force of the adhesive, which impairs the connection of the holder to the glass pane.

The present invention deals with the problem of specifying an improved embodiment for a holder of the type referred to at the beginning which is differentiated in particular by the holder being able to be fastened more easily to the glass pane.

The invention is based on the general concept of separating at least one first section, which is provided to fasten at least one component, in the supporting body with the aid of two separate slots in a wide part of the remaining supporting body. Therein, the two slots which run separately, so at a distance from one another, begin at a circumferential outer edge of the supporting body and end at a connection region which is at a distance to the outer edge, so lie within the supporting body. The first section remains connected to the remaining supporting body via this connection region. The slot completely penetrates the supporting body perpendicularly to the plane of the supporting body. The supporting body has a length measured in its plane and, transversely to this, a width which is likewise measured in the supporting body plane. The two slots can extend, depending on the size of the respective first section, which for its part depends on the size of the respective component to be applied thereto, for example over at least 50% of the width of the supporting body, preferably over at least 75% of the width of the supporting body, yet not completely over the entire width of the supporting body. Thus the respective first section is largely cut free from the remaining supporting body by the slots, whereby the first section is extensively moveable with respect to the remaining supporting body, for example in order to compensate for thermally-caused movements. At the same time, the supporting body can thus better follow a curvature of the glass pane without resulting in undesirably high restoring forces. Attaching the holder to a curved glass pane, preferably to a windscreen, can thus be simplified by the slots. The slots preferably extend transversely to the supporting body longitudinal direction; they have at least one longitudinal section running transversely to the supporting body longitudinal direction.

The respective component which is installed in the respective first section can preferably be a rain sensor or a light sensor or a fogging sensor or any combination thereof. It is also conceivable to attach a night vision camera to the holder with the aid of such a first section. For example, a soldered distributor, with the aid of which solder joints forming electrical contacts of an electrical screen heater which is integrated into the glass pane can be supplied with electrical energy, can be attached to the holder with the aid of such a first section. In particular it is therefore conceivable that two or more such first sections are provided on the supporting body which are arranged moveably with respect to the remaining supporting body.

In an advantageous embodiment, the connection region can be formed by a film hinge which connects the first section moveably to the remaining supporting body. The film hinge defines a pivot axis which preferably extends in parallel to the supporting body longitudinal direction. According to a particularly advantageous embodiment, the connection region can be connected moveably to the first section via a first film hinge and can be connected moveably to the remaining supporting body via a second film hinge. Pivot axes, which are defined by the film hinge, expediently extend in parallel to one another, wherein the respective pivot axis furthermore runs in parallel to the supporting body plane. Furthermore, the pivot axes or the film hinges can extend in parallel to the longitudinal direction of the supporting body. With the aid of the film hinges, an improved mobility of the first section perpendicularly to the supporting body plane furthermore results with regard to the remaining supporting body. This is of particular interest in the case where the first component is a rain and light sensor which can come loose in the case of unfavorable edge conditions of the glass pane. The mobility of the first section with regard to the remaining supporting body, which is enabled with the aid of the film hinge, prevents disadvantageous interaction of the remaining components which are fixed to the glass pane via the remaining supporting body in the case of loosening of the rain and light sensor. For example, two cameras of a stereo camera system or two lenses of a stereo camera can be arranged on the remaining supporting body, wherein the respective camera system can be integrated into a security system of the vehicle, which can initiate, for example, autonomous emergency braking and/or evasion procedures. A change of position of such a camera or such a lens could lead to considerable disadvantages.

In another advantageous embodiment, a first clip can be formed at least for one of the slots on the first section which protrudes over the respective slot and ends free-standing, while a second clip is formed on the remaining supporting body which protrudes over the respective slot and ends free-standing, wherein the two clips are arranged in particular to be aligned and at a distance one above the other and next to each other and overlap each other mutually. The clips lead to a limitation of the relative movement of the first section with respect to the remaining supporting body in a direction which runs perpendicularly to the plane of the supporting body.

In an advantageous development, a second section of the supporting body which is provided to fasten at least one further component can be connected moveably to a central region of the supporting body which contains the connection region via an expansion joint. Optionally, a third section of the supporting body which is likewise provided to fasten at least one further component can furthermore be connected moveably to the central region via an expansion joint.

For example, the further components can each be a camera of a stereo camera system or a lens of a stereo camera. The two sections are connected to opposite sides of the central region, to the central region and to the first section, and indeed in the longitudinal direction of the supporting body. If, therefore, the supporting body is divided into the three sections referred to, the second section and the third section lie on the outer sides, while the first section is arranged between the two outer sections.

A development is particularly advantageous in which the respective expansion joint is formed by a slot and at least one clip which bridges the slot in an arch shape. Expediently, each expansion joint is only provided with one single clip which bridges the relevant slot over a substantial slot length, preferably over the entire slot length.

Fundamentally it is possible that the slot of the respective joint merges into a slot to separate the first section. Furthermore, the slot can run at a right angle such that it extends in sections either in parallel to the width direction or transverse direction of the supporting body or in parallel to the longitudinal direction of the supporting body. Hereby the desired mobility can be particularly favorably adapted to the curvature of the glass pane.

Further important features and advantages of the invention result from the sub-claims, from the drawings and from the relevant figure description by means of the drawings.

It is understood that the features referred to above and explained in more detail below are not only able to be used in the respectively specified combination, but also in other combinations or alone, without leaving the scope of the present invention.

Preferred exemplary embodiments of the invention are depicted in the drawings and are explained in more detail in the description below, wherein the same reference numerals refer to the same or similar or functionally identical components.

DETAILED DESCRIPTION OF THE DRAWINGS

Figure 1:
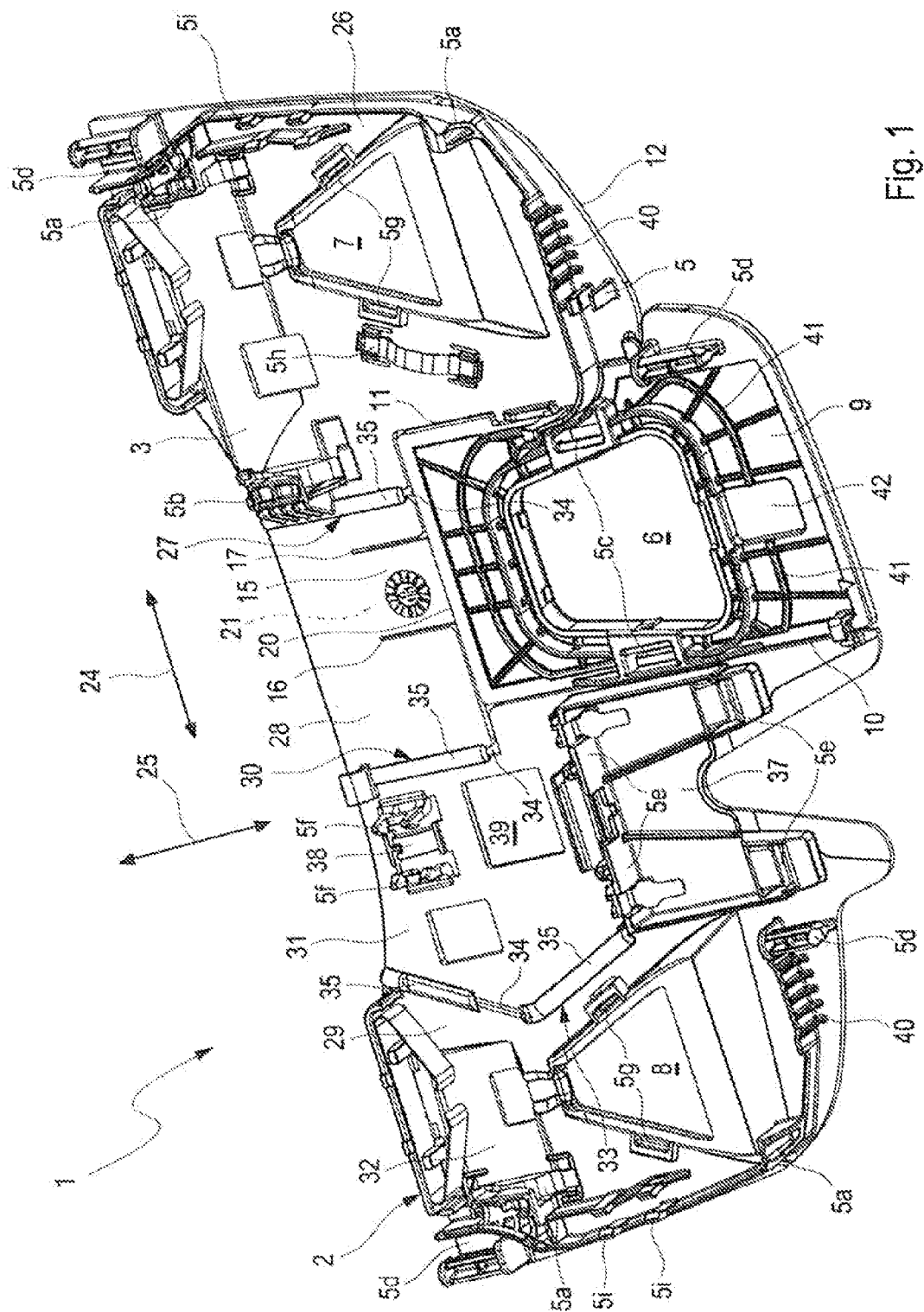
FIG. 1 is an isometric view of a holder.

Accordingly, FIG. 1 comprises a holder 1, with the aid of which at least one component can be fastened to a glass pane, preferably to a windscreen of a motor vehicle, a supporting body 2 which has an upper side 3 which faces towards the observer in FIGS. 1 to 4 and a lower side 4 which faces away from the observer. The supporting body 2 is able to be adhered to the glass pane with the lower side 4 by means of adhesion. Holding elements 5 are arranged on the upper side 3, with the aid of which components can be fastened to the supporting body 2. The supporting body 2 depicted here serves to receive at least three components. A first component space 6 for positioning a first component, a second component space 7 for positioning a second component, and a third component space 8 for positioning a third component are recognizable. The first component can, for example, be a combined rain and light sensor into which a fogging sensor can furthermore be integrated. For the fogging sensor, the supporting body 2 can then be equipped with an additional window 42. The second component can be a camera. The third component 8 can likewise be a camera, whereby a stereo camera system can be implemented overall. Instead of two separate cameras, the second and third components can also be formed by two lenses of a stereo camera. Furthermore, further holding elements 5 and component spaces are situated on the supporting body 2 shown here in order to be able to fix further components, sensors, lines and similar to the supporting body 2. For example, a fourth component space 37 for positioning a fourth component as well as a fifth component space 38 for positioning a fifth component are recognizable here. For example, the fourth component can be a night vision camera, for example an infra-red camera. The fifth component can be a so-called soldered distributor with which electrical contacts of the glass pane can be provided with electrical energy here. These contacts are preferably situated, in the case of a holder 1 attached to the glass pane, in a window 39 which is omitted in the carrier body 2, and are connected electrically to an electrical screen heater which is integrated into the glass pane. Furthermore, some of the holding elements 5 are provided to lock a cover, which is not shown here, in place, which can be designed as a shell and can cover the entire supporting body 2. Further holding elements 5 serve, for example, to attach blind covers which, for example, protect one or the other component spaces 6, 7, 8, 37, 38 from impurities, if the glass pane is temporarily stored or transported with the holders 1 attached thereto, before the glass panes is installed in a vehicle and/or before the components are installed in the holder.

For example, the holding elements 5a serve to fasten the stereo camera or the stereo camera system. The holding elements 5b can, for example, be used to install a mono camera. The holding elements 5c can, for example, be used to fasten the rain and light sensor or a blind cover. The holding elements 5d can be used to fasten the shell-shaped cover. The holding elements 5e can be used, for example, to attach the night vision camera. The soldered distributor can be fastened with the holding elements 5f. The holding elements 5g can be used to fix blind covers. Spring elements can be fastened with the holding elements 5h. The holding elements 5i serve as cable holders and cable guides. Furthermore, abutment links 40 can be provided to support a tool, for example in order to be able to extend the respective camera or the respective lens again. Ribs 41 can be provided to stiffen the supporting body 2 in the region of the first component space 6.

Figure 2:
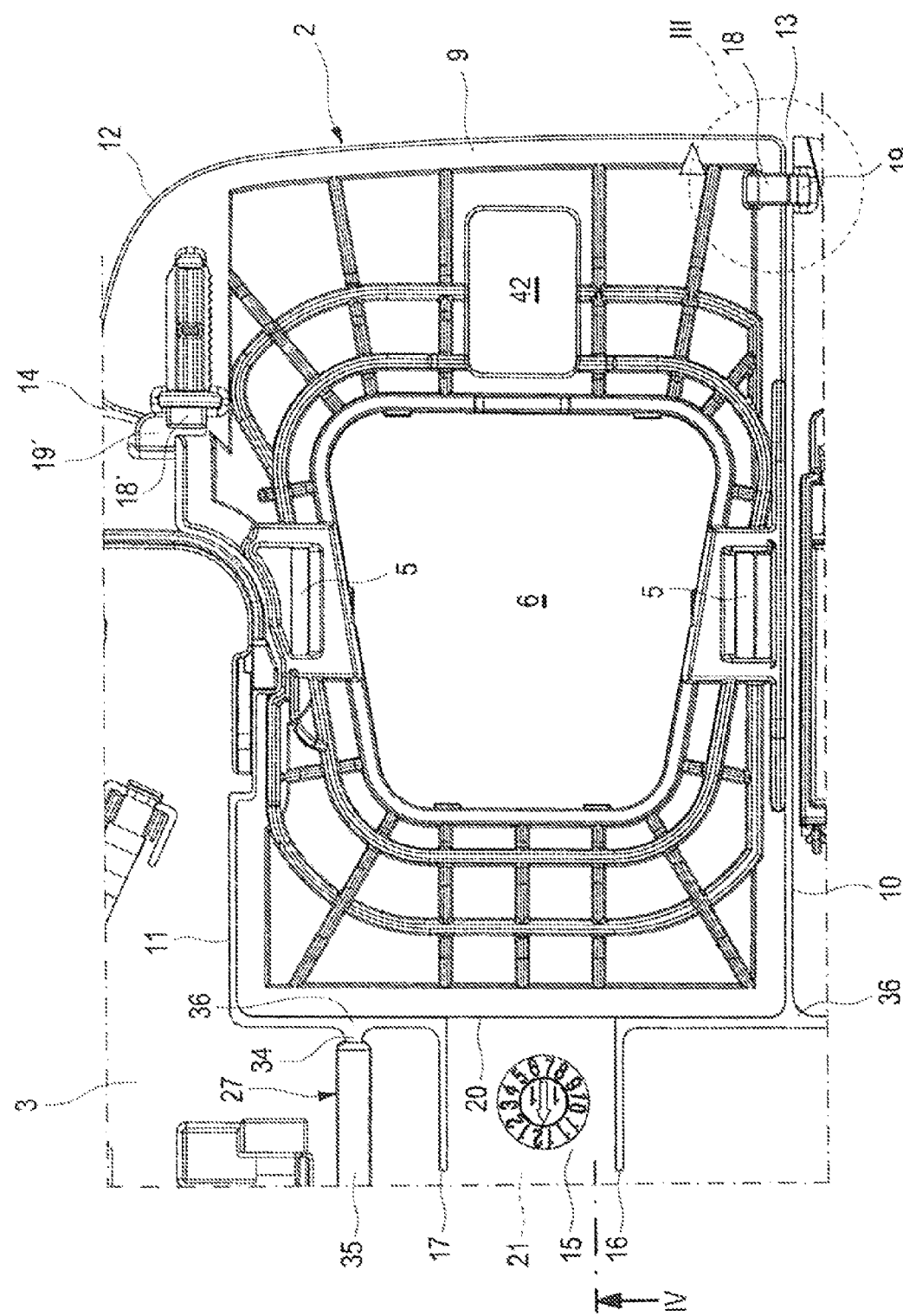
FIG. 2 is a top view onto the holder in the region of a first section.

In the case of the holder 1 presented here, according to FIGS. 1 and 2, a first section 9 of the supporting body 2, which is provided to fasten the first component, is separated from the remaining supporting body 2 along two separate slots 10, 11. Therein, both slots 10, 11 begin on an outer edge 12 of the supporting body; they therefore have an outlet 13 or 14 which is open towards or at the outer edge 12. Furthermore, both slots 10, 11 end at a connection region 15. The respective slot end is referred to in FIGS. 1 and 2 with 16 or 17. The first section 9 is connected to the remaining supporting body 2 via the connection region 15.

Figure 3:
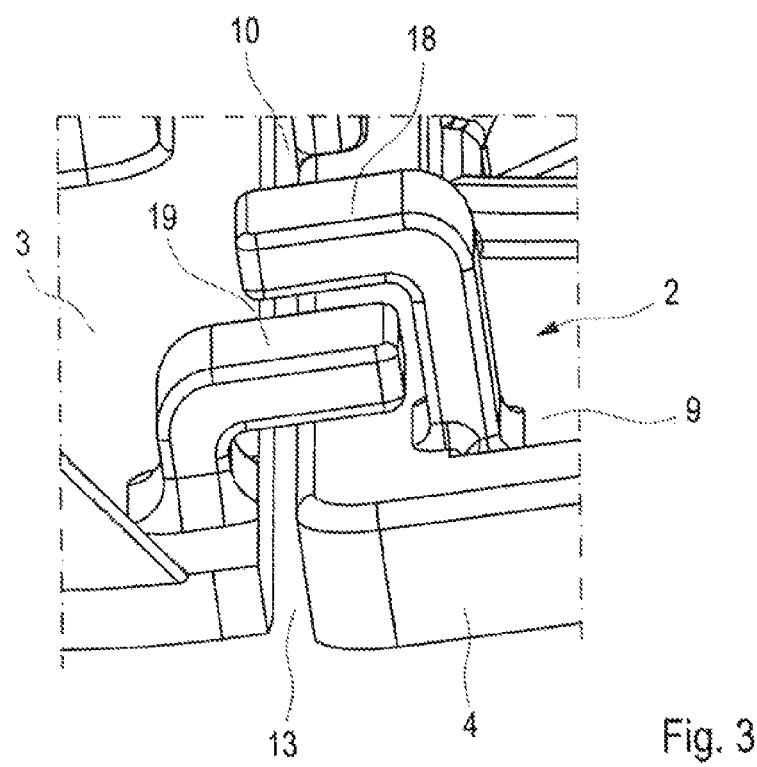
FIG. 3 is an isometric view of a detail III in FIG. 2.

According to FIGS. 1 to 3, at least in the case of one of the slots 10, 11, here at least according to FIG. 3, in the case of the slot referred to with "10", a first clip 18 is formed on the first section 9, which projects over the respective slot 10 and ends free-standing. The first clip 18 is designed to be L-shaped for this purpose. A second clip 19 is formed on the remaining supporting body 2, which likewise projects over the respective slot 10, and ends free-standing, and is also designed here to be L-shaped. Furthermore, the two clips 18, 19 are arranged on the same section of the respective slot 10, yet are designed in such a way that they are positioned at a distance one above the other and next to other. A similar configuration with two clips 18, 19 is also recognizable for another slot 11 according to FIG. 2 and is referred to there with 18' or 19'. The clips 18, 19 or 18', 19' are arranged perpendicularly to the supporting body plane, aligned with each other and overlapping each other such that they define a movement stop.

Figure 4:
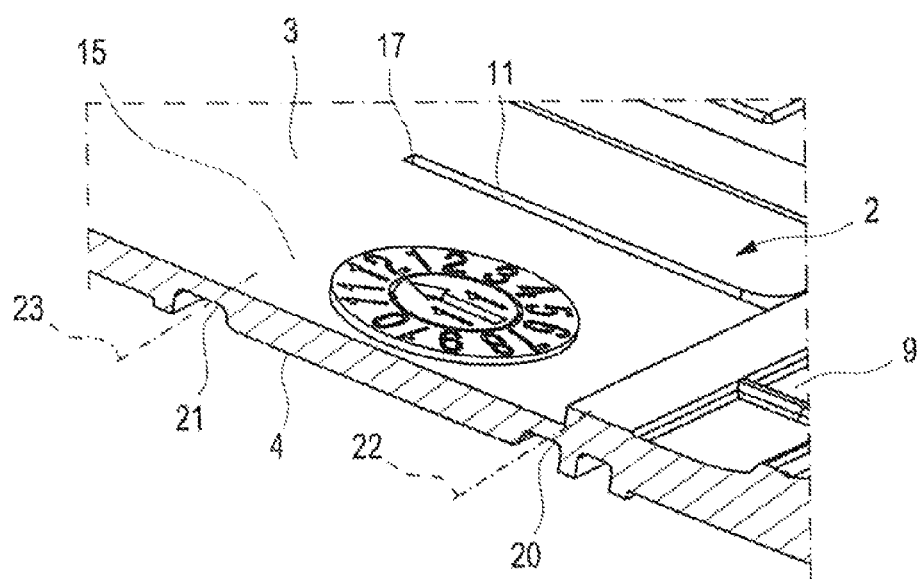
FIG. 4 is an isometric sectional view corresponding to a cut line IV in FIG. 2.

According to FIGS. 1, 2 and 4, the connection region 15 is connected moveably to the first section 9 via a first film hinge 20 and is connected moveably to the remaining supporting body 2 via a second film hinge 21. According to FIG. 4, the first film hinge 20 defines a first pivot axis 22 which runs in parallel to a plane in which the supporting body 2 lies. The second film hinge 21 defines a second pivot axis 23 which also runs in parallel to the supporting body plane. Furthermore, the two pivot axes 22, 23 run in parallel to each other as well as in parallel to a longitudinal direction 24 of the supporting body 2 indicated in FIG. 1 by a double arrow. Likewise, a transverse direction or width direction 25 of the supporting body 2 is indicated in FIG. 1. The longitudinal direction 24 and the width direction 25 span the supporting body plane and are perpendicular to each other.

According to FIG. 1, for the holder 1 presented here, a second section 26 is formed on the supporting body 2 which is provided to fasten the second component and which is connected to a central region 28 of the supporting body 2 via an expansion joint 27, which contains the connection region 15. Furthermore, a third section 29 is provided, which is provided to fasten the third component and which is likewise connected moveably to the central region 28 via a further expansion joint 30. In the example of FIG. 1, the third section 29 is furthermore divided into two partial sections 31, 32, which are connected moveably to each other via a further expansion joint 33. The one partial section 32 is provided to receive the third component and is connected moveably to the central region 28 via the other partial section 31.

The respective expansion joint 27, 30, 33 is thus formed respectively by a slot 34 and a clip 35, which bridges the respective slot 34 in an arched manner. Expediently, the respective clip 35 extends over the entire length of the relevant slot 34. The clip 35 is interrupted only between the two partial sections 31, 32 or two clips 35 are provided.

As can be gleaned in particular from FIG. 2, the respective slot 10, 11, which serves to separate the first section 9 from the remaining supporting body 2, can extend in sections in parallel to the supporting transverse direction 25 and in parallel to the supporting longitudinal direction 24. Furthermore, in the case of the embodiment shown here, the slots 10, 11 to separate the first section 9 merge into the slots 34 of the expansion joints 27, 30, via which the central region 28 is connected to the second section 26 and to the third section 29. These merging points are referred to in FIG. 2 with 36.

Although, in the preferred embodiment presented here, only one such first section 9 which is movable with respect to the remaining supporting body 2 by means of the slots 10, 11 is provided, in which the first component space 6 is located, in another embodiment it can be provided that the respective first section 9 is located within the supporting body 2 in another position, for example in the region of the fourth component space 37 or in the region of the fifth component space 38. Likewise, an embodiment is conceivable in which several such first sections 9 are provided, e.g., to implement the first component space 6 as well as the fourth component space 37 and/or fifth component space 38.

The invention claimed is:
1. A holder to fasten a component to a glass pane, comprising:
   a supporting body with a lower side, wherein the supporting body is adhereable to the glass pane by the lower side, and an upper side, wherein a holding element is included on the upper side and wherein the component is fastenable to the supporting body with the holding element;
   wherein a first section of the supporting body which includes the holding element is separated from a remaining portion of the supporting body along a first slot and a second slot, wherein both the first slot and the second slot each begin at an outer edge of the supporting body, each extend in a respective first section parallel to a transverse direction of the supporting body and in a respective second section parallel to a longitudinal direction of the supporting body, each end at a connection region at a distance from the outer edge, and each completely penetrate the supporting body perpendicularly to a plane of the supporting body, and wherein the first section of the supporting body is connected to the remaining portion of the supporting body by the connection region.
2. The holder according to claim 1, wherein the glass pane is a windscreen of a motor vehicle.

3. The holder according to claim 1, wherein the connection region is moveably connected to the first section of the supporting body via a first film hinge and is moveably connected to the remaining portion of the supporting body via a second film hinge.

4. The holder according to claim 1, further comprising a first clip on the first section of the supporting body which protrudes over a one of the first and second slots and ends free-standing and a second clip on the remaining portion of the supporting body which protrudes over the one of the first and second slots and ends free-standing, wherein the first and second clips are arranged at a distance one above the other and next to each other.

5. The holder according to claim 1, wherein a second section of the supporting body is moveably connected to a central region of the supporting body which contains the connection region via a first expansion joint, and/or a third section of the supporting body is moveably connected to the central region via a second expansion joint.

6. The holder according to claim 5, wherein the first and second expansion joints are formed by a respective slot and a clip which bridges the slot in an arched manner.

7. A holder to fasten a component to a glass pane, comprising:
a supporting body with a lower side, wherein the supporting body is adhereable to the glass pane by the lower side, and an upper side, wherein a holding element is included on the upper side and wherein the component is fastenable to the supporting body with the holding element;
wherein a first section of the supporting body which includes the holding element is separated from a remaining portion of the supporting body along a first slot and a second slot, wherein both the first slot and the second slot each begin at an outer edge of the supporting body and each end at a connection region at a distance from the outer edge, and wherein the first section of the supporting body is connected to the remaining portion of the supporting body by the connection region;
wherein the connection region is moveably connected to the first section of the supporting body via a first film hinge and is moveably connected to the remaining portion of the supporting body via a second film hinge.

8. A holder to fasten a component to a glass pane, comprising:
a supporting body with a lower side, wherein the supporting body is adhereable to the glass pane by the lower side, and an upper side, wherein a holding element is included on the upper side and wherein the component is fastenable to the supporting body with the holding element;
wherein a first section of the supporting body which includes the holding element is separated from a remaining portion of the supporting body along a first slot and a second slot, wherein both the first slot and the second slot each begin at an outer edge of the supporting body and each end at a connection region at a distance from the outer edge, and wherein the first section of the supporting body is connected to the remaining portion of the supporting body by the connection region; and
a first clip on the first section of the supporting body which protrudes over a one of the first and second slots and ends free-standing and a second clip on the remaining portion of the supporting body which protrudes over the one of the first and second slots and ends free-standing, wherein the first and second clips are arranged at a distance one above the other and next to each other.

9. A holder to fasten a component to a glass pane, comprising:
a supporting body with a lower side, wherein the supporting body is adhereable to the glass pane by the lower side, and an upper side, wherein a holding element is included on the upper side and wherein the component is fastenable to the supporting body with the holding element;
wherein a first section of the supporting body which includes the holding element is separated from a remaining portion of the supporting body along a first slot and a second slot, wherein both the first slot and the second slot each begin at an outer edge of the supporting body and each end at a connection region at a distance from the outer edge, and wherein the first section of the supporting body is connected to the remaining portion of the supporting body by the connection region;
wherein a second section of the supporting body is moveably connected to a central region of the supporting body which contains the connection region via a first expansion joint, and/or a third section of the supporting body is moveably connected to the central region via a second expansion joint;
and wherein the first and second expansion joints are formed by a respective slot and a clip which bridges the slot in an arched manner.

* * * * *